UNITED STATES PATENT OFFICE 2,682,514

COMPOSITIONS CONTAINING GLYCIDYL POLYETHER OF A POLYHYDRIC PHENOL AND AN EPOXIDIZED ESTER

Herbert A. Newey, Lafayette, Calif., assignor to Shell Development Company, Emeryville, Calif., a corporation of Delaware No Drawing. Application February 25, 1952,
Serial No. 273,338

14 Claims. (Cl. 260—18)

This invention relates to new compositions of matter which are particularly useful for many purposes in that they undergo cure to tough resinous materials upon addition thereto of curing agents with or without heating.

The compositions of the present invention comprise glycidyl polyether of a polyhydric phenol having a 1,2-epoxy equivalency greater than 1.0 in admixture with an epoxidized carboxylic acid ester containing non-terminal epoxide groups in the acyl groups thereof, i. e., epoxide groups with three members in the ring wherein each of the two chemical bonds of the epoxy oxygen atoms are linked to other than terminal carbon atoms and thus are not 1,2-epoxide groups. Compositions of particular suitability are mixtures of glycidyl polyether of a dihydric phenol having a 1,2-epoxy equivalency between 1.0 and 2.0, and an epoxidized triglyceride containing a plurality of the non-terminal epoxide groups, e. g., epoxidized soybean oil.

The glycidyl polyethers of polyhydric phenols are obtainable by reacting a polyhydric phenol with epichlorhydrin in basic medium at about 50° C. to 150° C. with use of more than one mol of epichlorhydrin per equivalent of phenolic hydroxyl group of the phenol and a slight stoichiometric excess of base such as about 2% to 30% excess sodium or potassium hydroxide. The reaction is effected by heating for several hours and the product is then separated from formed salt, excess base, and any unreacted epichlorhydrin. It is usually preferred to employ glycidyl polyether of a dihydric phenol in the invention, which product, instead of being a single simple compound, is generally a complex mixture of glycidyl polyethers, but the principal product may be represented by the formula

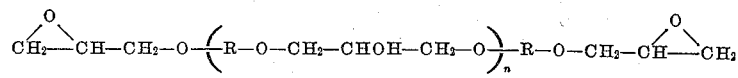

wherein $n$ is an integer of the series 0, 1, 2, 3 . . . , and R represents the divalent hydrocarbon radical of the dihydric phenol. While for any single molecule of the polyether $n$ is an integer, the fact that the obtained polyether is a mixture of compounds causes the determined value for $n$, e. g., from molecular weight measurement, to be an average which is not necessarily zero or a whole number. Although the polyether is a substance primarily of the above formula, it may contain some material with one or both of the terminal glycidyl radicals in hydrated form, and therefore, the 1,2-epoxy equivalency approaches, but is not equal to 2.0; it is a value between 1.0 and 2.0.

The simplest of the polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The 1,2-epoxy equivalency of the glycidyl polyether refers to the number of 1,2-epoxy groups

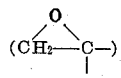

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N pyridinium chloride in chloroform solution at the boiling point under reflux for two hours whereby the pyridinium chloride hydrochlorinates the epoxy groups to chlorhydrin groups. After cooling, the excess unreacted pyridinium chloride is back-titrated with 0.1 N sodium hydroxide in methanol to the phenolphthalein end point. The epoxide value is calculated by considering one HCl as equivalent to one epoxide group. This method is used for obtaining all epoxide values discussed herein.

Any of the various polyhydric phenols is used in preparing the polyethers employed in the invention including mononuclear phenols such as resorcinol, catechol, hydroquinone, methyl resorcinol, etc.; or polynuclear phenols like 2,2-bis(4-hydroxyphenyl)propane which is termed bis-phenol herein for convenience, 4,4'-dihydroxybenzophenone, bis(4 - hydroxyphenyl)-methane, 1,1-bis(4-hydroxyphenyl)ethane, 1,1-bis(4 - hydroxyphenyl)isobutane, 2,2 - bis(4 - hydroxyphenyl) butane, 2,2-bis(4-hydroxy-2-methylphenyl)propane, 2,2 - bis(4 - hydroxy - 2 - tertiary - butylphenyl)propane, 2,2 -bis(2 - hydroxy - naphthyl)pentane, 1,5 - dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Particularly preferred polyethers used in the invention are prepared from 2,2-bis(4-hydroxyphenyl)propane. They contain a chain of alternating glyceryl and 2,2-bis(4-hydroxyphenylene)propane radicals separated by intervening ethereal oxygen atoms and have a 1,2-epoxy equivalency between 1.0 and 2.0. These preferred polyethers will be better understood from consideration of the following described preparations and the properties of the products. The parts are by weight.

POLYETHER A

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to remove the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether of bis-phenol has a Durrans' Mercury Method softening point of 9° C., an average molecular weight of 370 by ebullioscopic measurement in ethylene dichloride, and an epoxide value of 0.50 epoxy equivalents per 100 grams. It has an epoxide equivalent weight of 200 and a 1,2-epoxy equivalency of 1.85. The product is designated herein as Polyether A.

POLYETHER B

A solution consisting of 11.7 parts of water, 1.22 parts of sodium hydroxide, and 13.38 parts of bis-phenol is prepared by heating the mixture of ingredients to 70° C. and then cooling to 46° C. at which temperature 14.06 parts of epichlorhydrin are added while agitating the mixture. After 25 minutes had elapsed, there is added during an additional 15 minutes' time a solution consisting of 5.62 parts of sodium hydroxide in 11.7 parts of water. This causes the temperature to rise to 63° C. Washing with water at 20° C. to 30° C. temperature is started 30 minutes later and continued for 4½ hours. The product is dried by heating to a final temperature of 140° C. in 80 minutes, and cooled rapidly. At room temperature, the product is an extremely viscous, semi-solid having a softening point of 27° C. by Durrans' Mercury Method, an epoxide equivalent weight of 245 and a molecular weight of 460. The 1,2-epoxy equivalency is 1.88. This product will be referred to hereinafter as Polyether B.

POLYETHER C

Polyethers of higher molecular weight are prepared by using smaller ratios of epichlorhydrin to bis-phenol. In a vessel fitted with an agitator, 228 parts (1 mol) of bis-phenol and 86 parts (2.14 mols) sodium hydroxide as a 10% aqueous solution are introduced and heated to about 45° C. whereupon 189 parts (2.04 mols) of epichlorhydrin are added rapidly while agitating the mixture. The temperature of the mixture is then gradually increased and maintained at about 95° C. for 80 minutes. The mixture separates into a two-phase system and the aqueous layer is drawn off from the taffy-like product which forms. The latter is washed with hot water while molten until the wash water is neutral to litmus. The product is then drained and dried by heating to a final temperature of 130° C. The softening point of the resulting glycidyl polyether is 43° C. The measured molecular weight of the product is 620 and it has an epoxide value of 0.29 epoxy equivalents per 100 grams. The epoxide equivalent weight is 345 and the 1,2-epoxy equivalency is 1.8. It will be identified hereinafter as Polyether C.

POLYETHER D

This glycidyl polyether is prepared in like manner to that of Polyether C except that for each mol of bis-phenol there is employed 1.22 mols of epichlorhydrin and 1.37 mols of sodium hydroxide. The resulting polyether has a softening point of 98° C. by Durrans' Mercury Method, a molecular weight of 1400 as measured ebullioscopically in ethylene dichloride, and an epoxide value of 0.11 epoxy equivalents per 100 grams. The epoxide equivalent weight is 910, and the 1,2-epoxy equivalency is 1.54.

POLYETHER E

Glycidyl polyethers of still higher molecular weight are most easily prepared by heating together and reacting a lower polyether with additional dihydric phenol. Thus 100 parts of Polyether D are heated to 150° C., and then 5 parts of bis-phenol are added. The heating is continued for about two hours while stirring the reaction mass and gradually increasing the temperature to about 200° C. The resulting product has a softening point of 131° C., a molecular weight of 2900, an epoxide value of 0.05 epoxy equivalents per 100 grams, an epoxide equivalent weight of 2000, and a 1,2-epoxy equivalency of 1.45.

The second component in the composition of the invention an epoxidized carboxylic acid ester containing non-terminal epoxy groups or oxirane rings in the acyl groups, is obtained by epoxidizing carboxylic acid esters containing olefinic unsaturation in the acyl groups with per fatty acids such as peracetic acid or performic acid. For example, see the methods described in U. S. Patent No. 2,485,160. The epoxidized compounds can be epoxidized esters of monohydric, dihydric, trihydric and polyhydric alcohols of carboxylic acids, particularly fatty acids, containing non-terminal olefinic unsaturation such as epoxidized soybean, cottonseed, peanut, olive, corn, tobacco seed, perilla, castor, linseed, sunflower and safflower oils, as well as epoxidized esters of methanol, ethanol, butanol, ethylene glycol, diethylene glycol, trimethylene glycol, trimethylol propane, glycerol, beta-methylglycerol, diglycerol, pentaerythritol, dipentaerythritol, mannitol, sorbitol, polyallyl alcohol, etc., with olefinic acids of the above-named oils as well as dimerized drying oil acids including dimerized linseed oil, soybean oil, tung oil, and cottonseed oil acids. The epoxidized esters are substantially neutral in having an acid number below 10.

A class of preferred epoxidized esters is epoxidized vegetable oils which contain at least two epoxy groups per molecule and are liquid at 20° C. Preferably the epoxidized vegetable oils contain about 2.5 to 5 epoxy groups per molecule and are thus characterized by having a plurality of non-terminal epoxy groups. Epoxidized soybean oil is a particularly suitable member of the preferred class.

The compositions of the invention consisting of the glycidyl polyether and the epoxidized ester have the two components present in various proportions such as from about 5% to 90% of the epoxidized ester by weight. Ordinarily the epoxidized ester constitutes a minor proportion of the compositions. Compositions of great utility contain about 10% to 25% of epoxidized ester.

The compositions of the invention are easily prepared. In the case where both the glycidyl polyether and the epoxidized ester are liquids at ordinary temperature, the two components can be stirred together. If one or both constituents are normally solid or very viscous, they can be heated to mobile consistency for mixing. Use of a heated roll mill is convenient in such instance. Another convenient method for preparation of the compositions is dissolving in mutual solvents. A variety of substances are suitable for this purpose including ketones such as acetone, methyl ethyl ketone, methyl isobutyl ketone, isophorone, etc.; esters such as butyl acetate, the acetate of monoethyl ether of ethylene glycol, etc.; other alcohols such as methyl, ethyl or butyl ether of ethylene glycol or diethylene glycol, etc.; chlorinated solvents such as trichloropropane, chloroform, etc.; or mixtures of one or more of such compounds with aromatic hydrocarbons such as benzene, toluene, xylene, etc. In preparing solvent-free compositions of the invention with use of mutual solvents, the glycidyl polyether and the epoxidized ester are first dissolved in the solvent and then the solvent is removed by evaporation with or without the aid of heat.

The compositions of the invention have particular utility because upon addition thereto of a curing agent with or without application of heat, the mixtures undergo resinification to hard tough resins suitable for a variety of uses such as protective surface coatings, adhesives for metal-to-metal bonding, potting applications and molding operations. Depending upon the particular application to which the compositions are put, they may also contain, besides the glycidyl polyether and epoxidized ester, one or more various other materials such as solvents, fillers, pigments, dyes, plasticizers, and other resins.

A variety of substances are useful in effecting cure of the compositions, but acidic materials are particularly suitable. These include citric acid, oxalic acid, succinic acid, phosphoric acid, butyl dihydrogen phosphate, benzene disulfonic acid, complexes of boron trifluoride with ethers, phenols and amines, and the like. Various amounts of the curing agent can be added although in general about an added 1% to 25% by weight is employed. Cure of the mixtures containing the curing agent can be allowed to occur without application of heat, but it is more usual to employ an elevated temperature such as about 50° C. to 200° C. in order to decrease the time of cure. Depending upon the temperature, adequate cure is obtained in from about 5 minutes to 1 or 2 hours' time. Higher temperatures permit less time for cure which is conveniently determined by development of insolubility in methyl ethyl ketone.

The compositions of the invention have very advantageous properties. As explained above, they resinify with the aid of curing agents to hard tough resinous materials. It appears that the epoxidized ester has reacted and is chemically bound with the glycidyl polyether in the resinified products which have great physical strength. On the other hand, epoxidized esters alone after cure are relatively soft gels with little or no physical strength and this is especially true of epoxidized vegetable oils in cured condition. Moreover, incorporation of a vegetable oil as such into glycidyl polyether of a polyhydric phenol followed by cure of the composition gives a non-homogeneous product with greatly reduced physical strength as compared to the cured glycidyl polyether or cured compositions of the invention. Cure of glycidyl polyether of a polyhydric phenol alone gives resinous products which are unduly brittle with lack of distensibility needed in most applications. It was, therefore, surprising to discover that the compositions of the invention had such advantageous properties permitting versatile utility.

The following examples are given for the purpose of illustrating, but not limiting, the invention. The parts are by weight.

*Example 1*

A composition consisting of 50 parts of Polyether D and 50 parts of epoxidized soybean oil was dissolved in 25 parts of toluene and 25 parts of the acetate of monoethyl ether of ethylene glycol. The epoxidized soybean oil contained about 3.6 epoxy groups per molecule and was the same as the epoxidized oil to be referred to in later examples. To the solution were added 10 parts of phosphoric acid as curing agent. A film was formed with the aid of a 5 mil doctor blade on a glass panel. The solvent was allowed to evaporate from the film and it was then cured by baking for 10 minutes at 300° F. The resulting cured film was clear, hard and tough.

In contrast to the above result, the attempt to cure epoxidized soybean oil alone with phosphoric acid and application of heat at like temperature gives only a soft crumbly gel as product. Addition of 10 parts of phosphoric acid to a 50% solution of Polyether D in equal parts of toluene and the acetate of monoethyl ether of ethylene glycol and preparing a film by baking for 10 minutes at 300° F. as described above, gave a cured film having undue brittleness. Upon plowing a knife point through the film, the cured material broke from the substrate as a shower of chips. On the other hand, performing the knife test on the cured film of the invention described above, gave a continuous ribbon indicating its tough flexible character.

Furthermore, mixing an equal weight of soybean oil with Polyether D and preparing a solution in solvents with spreading as a film with a doctor blade results in a cloudy film showing incompatibility whether phosphoric acid and heat are employed to effect cure or not.

Example 2

A mixture of 75 parts of Polyether D and 25 parts of epoxidized soybean oil was dissolved in 37.5 parts of xylene, 37.5 parts of the acetate of monoethyl ether of ethylene glycol and 10 parts of acetone. About 20 parts of citric acid were added as curing agent and films were formed on sheet steel panels with the aid of a doctor blade. After curing by baking for 15 minutes at 160° C., the resulting films were clear, hard and tough. Upon bending the coated panel over a one-eighth inch mandrel, no fracture of the cured film resulted. A continuous ribbon was obtained upon plowing the cured film with a knife point. A film prepared in like manner by curing Polyether D alone with citric acid gave a shower of brittle chips when plowed with the knife point.

Upon adding 20 parts of citric acid to 100 parts of epoxidized soybean oil and heating at 160° C. for 30 minutes, only a soft gel resulted.

Example 3

A mixture of 75 parts of Polyether E and 25 parts of epoxidized soybean oil was dissolved in 70 parts of xylene, 70 parts of the acetate of monoethyl ether of ethylene glycol and 28 parts of acetone. To the solution were added 2 parts of the complex of p-cresol and boron trifluoride as a 20% solution in isopropanol. Films were formed on sheet steel panels with a doctor blade and were cured by baking for 15 minutes at 160° C. The resulting films were again clear, hard and tough as well as being resistant to fracture upon bending over a one-eighth inch mandrel. Plowing the film with a knife point gave a continuous ribbon of product. A film obtained in like manner from a solution containing no epoxidized oil gave a shower of chips when plowed with the knife point indicating unsatisfactory brittleness.

Example 4

An extensive series of compositions were prepared in order to test compositions of the invention. Mixtures of epoxidized soybean oil with each of Polyethers A, B, C, D and E were prepared containing weight ratios of epoxidized oil to polyether of 1:9, 1:1 and 9:1. Solutions were prepared from the mixtures with use of a solvent containing equal parts of toluene and the acetate of monoethyl ether of ethylene glycol such that the solutions contained equal weights of solvent and polyether. To portions of each solution were then added 1% and 10% of citric acid based upon the weight of epoxidized oil plus polyether. The solutions containing the curing agent were then spread on glass panels with a 5 mil doctor blade, allowed to dry and the films were cured by baking for 10 minutes at 300° F. In all cases, a hard, clear, tough film was obtained.

Example 5

A composition was prepared by mixing 12 parts of epoxidized soybean oil to 100 parts of Polyether A. The liquid composition had a viscosity of 35,700 centipoises at 25° C. About 30 parts of fine asbestos fiber (Johns-Manville 7TF-2) were mixed into the composition and then 5 parts of N, N-diethyl-1,3-propanediamine were added as curing agent. This mixture was spread on a surface of clean aluminum blocks with a 5 mil doctor blade, the coated surfaces were joined, and the joined blocks were heated in an air oven set at 200° F. for 45 minutes to effect cure. The tensile shear strength of the joined blocks was determined at 77° F. and found to be 3200 pounds per square inch. The composition was exceptionally useful for adhesive uses because high shear strength is retained at low temperatures. Upon measuring shear strength of duplicate joined blocks at −70° F., a shear strength of 2335 pounds per square inch was obtained.

In contrast to the foregoing results, it was found that upon mixing 10 parts of N,N-diethyl-1,3-propanediamine with 100 parts of epoxidized soybean oil and heating the mixture for 30 minutes at 160° C., no cure occurred.

Example 6

The extent of "tightness" of cure of compositions containing glycidyl polyethers of polyhydric phenols and other ingredients can be determined accurately by subjecting the cure compositions to a thermal shock test. The composition in admixture with the curing agent is placed in a paper cup having the shape of a truncated cone. A one-half inch steel cube is suspended by a copper wire in the center of the resin-forming mixture and the assembly is placed in an air oven for the desired time and temperature to resinify the composition. The paper cup is removed and the resin sample is obtained having a truncated cone shape of about two inches high with a lower diameter of about 1½ inches and an upper diameter of about 1¼ inches.

The resin sample containing the steel cube is subjected to repeated variations of temperatures. The fully cured resin has very high inherent strength, but cracks will appear if the strains set up by the difference in thermal expansion of the steel cube and the resin are greater than the strength of the resin.

The thermal shock test is performed by thrusting the resin sample into crushed Dry Ice (solid carbon dioxide) for an hour where the temperature reaches about −70° C. The sample is then removed and allowed to warm up by standing in open air at room temperature for one hour. The sample is inspected for cracks, and if none are present, the cycle is repeated twice.

Compositions were prepared containing 10 and 20 parts of epoxidized soybean oil in admixture with 100 parts of Polyether A and there were added to each 10.5 parts of curing agent which was tri(dimethylaminomethyl)phenol tri(2-ethylhexoate) made by neutralizing one mol of the aminophenol with 3 mols of the acid. The compositions were poured into the paper cups with steel cubes suspended therein and cured by heating in an oven set at 65° C. for 2 hours. The cured compositions were then subjected to the above-described thermal shock test and were found to be entirely free of cracks or fracture at the end thereof.

The glycidyl polyethers of polyhydric phenols referred to herein are condensates of polyhydric phenols with epichlorhydrin. Particularly when derived from dihydric phenols, these materials are known as "ethoxyline" resins. See Chemical Week, vol. 69, page 27, for September 8, 1951.

I claim as my invention:

1. A composition comprising an epoxidized carboxylic acid ester containing a plurality of non-terminal epoxy groups in the acyl groups thereof in admixture with glycidyl polyether of a polyhydric phenol having a 1,2-epoxy equivalency greater than 1.0.

2. A composition as defined in claim 1 wherein the epoxidized ester and the glycidyl polyether are present in a weight ratio of about 5:95 to 90:10.

3. A composition as defined in claim 1 wherein the epoxidized ester and the glycidyl polyether are present in a weight ratio of about 10:90 to 25:75.

4. A composition comprising glycidyl polyether of a dihydric phenol having a 1,2-epoxy equivalency between 1.0 and 2.0 in admixture with a minor proportion of an epoxidized carboxylic acid ester having a plurality of epoxy groups therein which are contained in the acyl groups of the ester.

5. A composition as defined in claim 4 wherein the dihydric phenol is 2,2-bis(4-hydroxyphenyl)propane.

6. A composition comprising about 5% to 25% by weight of an epoxidized vegetable oil containing about 2.5 to 5 non-terminal epoxy groups per molecule in admixture with glycidyl polyether of a polyhydric phenol having a 1,2-epoxy equivalency greater than 1.0.

7. A composition as defined in claim 6 wherein the epoxidized oil is epoxidized soybean oil.

8. A composition as defined in claim 6 wherein the epoxidized oil is epoxidized linseed oil.

9. A composition as defined in claim 6 wherein the epoxidized oil is epoxidized cottonseed oil.

10. A composition comprising about 5% to 25% by weight of an epoxidized vegetable oil containing about 2.5 to 5 non-terminal epoxy groups per molecule in admixture with glycidyl polyether of a dihydric phenol having a 1,2-epoxy equivalency between 1.0 and 2.0.

11. A composition as defined in claim 10 wherein the dihydric phenol is 2,2-bis(4-hydroxyphenyl)propane.

12. A composition as defined in claim 11 wherein the epoxidized oil is epoxidized soybean oil.

13. A composition as defined in claim 11 wherein the epoxidized oil is epoxidized linseed oil.

14. A composition as defined in claim 11 wherein the epoxidized oil is epoxidized cottonseed oil.

References Cited in the file of this patent

UNITED STATES PATENTS

| Number | Name | Date |
|---|---|---|
| 2,485,160 | Niederhauser et al. | Oct. 18, 1949 |
| 2,528,932 | Wiles et al. | Nov. 7, 1950 |